United States Patent
Han

(10) Patent No.: US 10,205,605 B2
(45) Date of Patent: Feb. 12, 2019

(54) AUTOMATIC COOKING DEVICE STANDARDIZATION SYSTEM

(71) Applicant: Tae-hee Han, Seoul (KR)

(72) Inventor: Tae-hee Han, Seoul (KR)

( * ) Notice: Subject to any disclaimer, the term of this patent is extended or adjusted under 35 U.S.C. 154(b) by 17 days.

(21) Appl. No.: 14/916,112

(22) PCT Filed: Sep. 5, 2014

(86) PCT No.: PCT/KR2014/008420
§ 371 (c)(1),
(2) Date: Mar. 2, 2016

(87) PCT Pub. No.: WO2015/034327
PCT Pub. Date: Mar. 12, 2015

(65) Prior Publication Data
US 2016/0241415 A1    Aug. 18, 2016

(30) Foreign Application Priority Data

Sep. 5, 2013   (KR) ........................ 10-2013-0106370

(51) Int. Cl.
*A47J 37/12*   (2006.01)
*H04L 12/28*   (2006.01)
*G06Q 50/12*   (2012.01)
*A47J 36/00*   (2006.01)

(52) U.S. Cl.
CPC .......... *H04L 12/2807* (2013.01); *A47J 36/00* (2013.01); *G06Q 50/12* (2013.01)

(58) Field of Classification Search
CPC ....... A47J 36/00; G06Q 50/12; H04L 12/2807

USPC ................ 99/325, 334, 352, 355, 357, 484;
426/237, 243, 296, 388, 390, 518;
221/135, 150 R, 150 A
See application file for complete search history.

(56) References Cited

U.S. PATENT DOCUMENTS

| | | | | |
|---|---|---|---|---|
| 5,997,924 | A * | 12/1999 | Olander, Jr. | ........... A21C 11/00 221/135 |
| 7,174,830 | B1 * | 2/2007 | Dong | ..................... B25J 9/0084 901/1 |
| 2001/0024671 | A1 * | 9/2001 | Pilati | ........................ A21C 9/04 426/289 |
| 2004/0173103 | A1 * | 9/2004 | Won | ........................ A47J 27/62 99/326 |

(Continued)

FOREIGN PATENT DOCUMENTS

KR   10-2000-0068789 A   11/2000
KR   10-2004-0077433 A    9/2004
(Continued)

*Primary Examiner* — Dana Ross
*Assistant Examiner* — Joseph Iskra
(74) *Attorney, Agent, or Firm* — KORUS Patent, LLC; Seong Il Jeong

(57) ABSTRACT

An automatic cooking device standardization system is provided. The automatic cooking device standardization system includes a cold storage for storing food ingredients used for cooking, a cooking chamber capable of cooking dishes according to a cooking recipe, and a conveyor unit for conveying the food ingredients for each dish from the cold storage to cooking containers in the cooking chamber according to the cooking recipe. The automatic cooking device standardization system is capable of automatically cooking dishes without requiring user's manual work.

5 Claims, 1 Drawing Sheet

(56) References Cited

U.S. PATENT DOCUMENTS

2005/0193901 A1* 9/2005 Buehler .................. A47J 44/00
                                                      99/468
2006/0191885 A1* 8/2006 Near ...................... A47J 27/62
                                                      219/214
2010/0303972 A1* 12/2010 Srivastava ................ A23L 5/10
                                                      426/233

FOREIGN PATENT DOCUMENTS

| KR | 10-2005-0087039 A | 8/2005 |
| KR | 10-2011-0139492 A | 12/2011 |
| KR | 10-2013-0048055 A | 5/2013 |

* cited by examiner

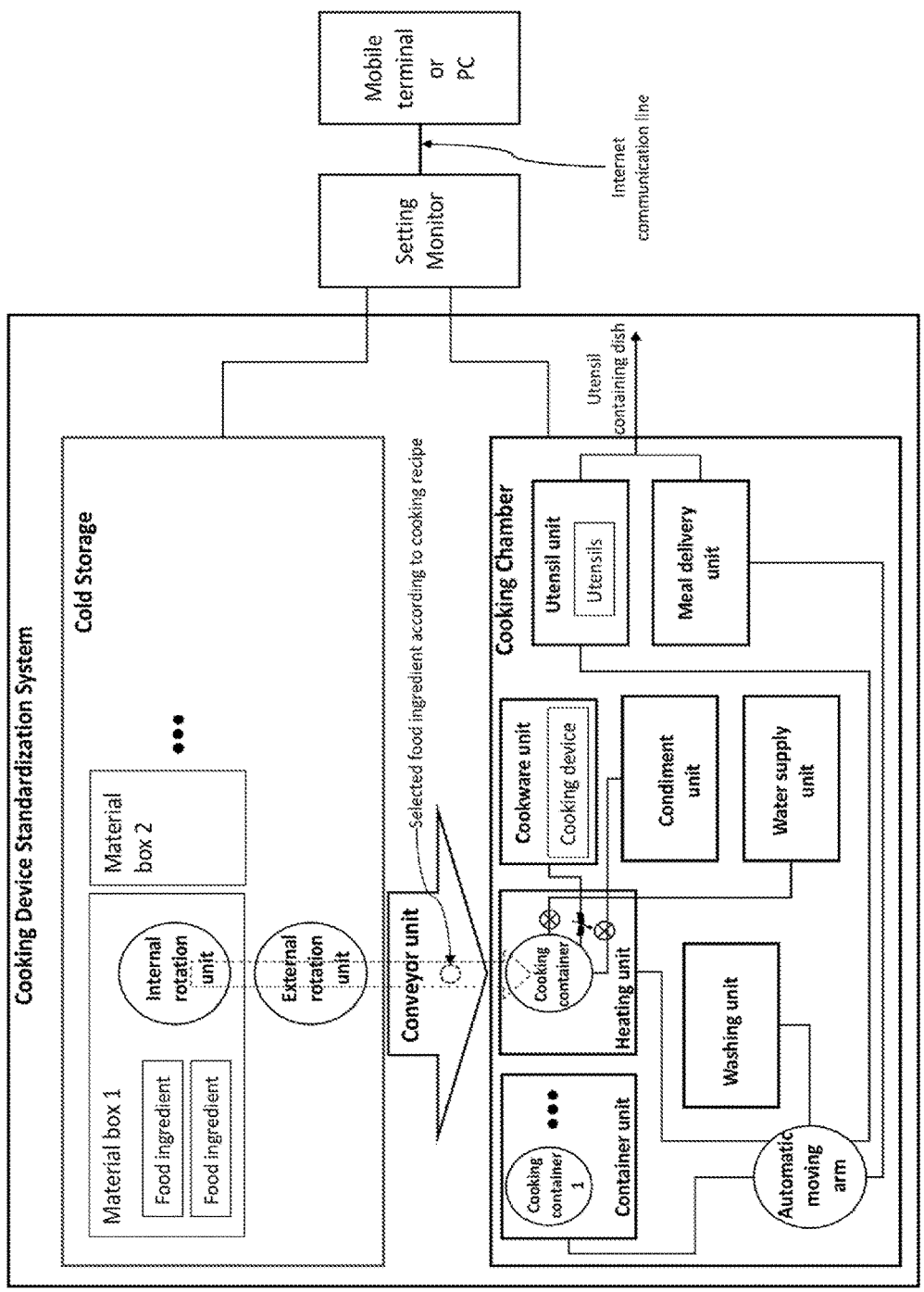

AUTOMATIC COOKING DEVICE STANDARDIZATION SYSTEM

CROSS-REFERENCE TO RELATED APPLICATION(S)

This application claims the benefit of International Application No. PCT/KR2014/008420 filed on Sep. 5, 2014 based on Korean Patent Application No. 10-2013-0106370 filed on Sep. 5, 2013, the disclosures of which are herein incorporated by reference in their entirety.

TECHNICAL FIELD

The present invention relates to an automatic cooking device standardization system. More specifically, the present invention provides an automatic cooking device standardization system which is configured such that, when standardizing a method or system for cooking one or two dishes without user's manual work, a standardized product is prepared from basic components comprising: a cold storage for storing food ingredients, a cooking chamber capable of automatically cooking dishes, and a conveyor unit for automatically conveying ingredients for each dish from the cold storage to cooking containers in the cooking chamber according to a cooking order and time, thereby the standardized product can be delivered to a shop or a restaurant and the like, food ingredients entering the cold storage of each product are prepared in advance and then continuously delivered to a consumer which has bought the product or the consumer can purchase the product from a shop and a food store or the like.

BACKGROUND OF ART

In general, the cooking devices being used when cooking dishes include a microwave, an electronic rice cooker and a microwave oven. These cooking devices are configured such that, through user's manual work, food ingredients are prepared in a state before being heated, put in each device and then cook a dish, but there were no devices capable of automatically cooking a dish without performing manual work. In addition, there was an uncomfortable problem of not being eaten cooked dishes without requiring user's manual work one by one using various cooking devices in the sink.

DETAILED DESCRIPTION OF THE INVENTION

Technical Problem

It is an object of the present invention to solve the above-mentioned problems of the prior arts and to provide an automatic cooking device standardization system capable of automatically cooking dishes without requiring user's manual work when cooking dishes using a cooking device, and also cooking dishes without performing manual work one by one when cooking dishes using various cooking devices in the sink.

Technical Solution

In order to achieve the above objects, the present invention provides an automatic cooking device standardization system capable of automatically cooking dishes without requiring user's manual work, characterized in that the automatic cooking device is standardized by installing a cold storage for storing food ingredients used for each cooking, installing a cooking chamber capable of cooking dishes according to the cooking method, order and time during the cooking, and installing a conveyor unit for conveying food ingredients for each dish from the cold storage to cooking containers in the cooking chamber according to a cooking order and time.

The automatic cooking device having the above configuration is standardized in a manner that can cook one or two dishes depending on the cooking type, the standardized automatic cooking device is delivered to a shop or a restaurant, food ingredients stored in a cold storage of each automatic cooking device is standardized by processing them to fit the size of the material box entering each material compartment of the cold storage, and the standardized product is delivered to a consumer, a restaurant or a shop which has purchased the above-mentioned automatic cooking device.

Advantageous Effects

According to the automatic cooking device standardization system of the present invention having the above-described characteristic configurations, one or two dishes can be automatically cooked without user's manual work by using the standardized automatic cooking device during the cooking. Also, without the need to directly care for the respective food ingredients in consumer's homes or restaurants or the like, the standardized and processed food ingredients can be continuously delivered to or obtained from a shop or a restaurant which has purchased the automatic cooking device. Further, the automatic cooking device can play an auxiliary role of chef when the restaurant is busy, while general consumers can have a margin of time without manual work to prepare meals or the like, thereby providing a useful system that more time can be used for hobby activities, child education and sideline.

BRIEF DESCRIPTION OF THE DRAWINGS

FIGURE shows a configuration of the automatic cooking device standardization system according to an embodiment of the present invention.

DETAILED DESCRIPTION OF THE EMBODIMENTS

Below, preferred embodiments of the automatic cooking device standardization system according to the present invention will be described in more detail.

According to the present invention, there is provided an automatic cooking device standardization system capable of automatically cooking dishes without manual work, characterized in that the automatic cooking device is standardized by installing a cold storage for storing food ingredients used for each cooking, installing a cooking chamber capable of cooking dishes according to the cooking method, order and time during the cooking, and installing a conveyor unit for conveying food ingredients for each dish from the cold storage to cooking containers in the cooking chamber according to a cooking order and time. FIGURE shows a configuration of the automatic cooking device standardization system according to an embodiment of the present invention.

Specifically, the above-described cold storage comprises a configuration of processing food ingredients by dividing material compartments capable of storing the respective ingredients in the cold storage; a configuration of processing food ingredients by making material box capable of taking out or putting in each material storage compartment; a configuration of processing food ingredients by plurally dividing them within the respective material boxes in an amount for one person and putting the ingredients on the box; a configuration of installing an internal rotation unit in the material box so that the food ingredients can be taken out for one person or plural persons; a configuration of installing an external rotation unit capable of rotating in engagement with the outside of the material box; a configuration capable of maintaining the freshness of the food ingredients by rapidly freezing the material box when the standardized automatic cooking device is not used for a long period of time; and a configuration of processing the food ingredients by installing a rapid cooling device and a thawing device capable of thawing upon re-use.

The above-described cooking chamber comprises: a configuration of processing food ingredients by disposing a container unit that can put a container such as a fried fan for cooking dishes; a configuration of processing food ingredients by disposing a cookware unit which can place a cooking device or the like for agitating or mixing the ingredients during the cooking; a configuration of processing food ingredients by installing a heating unit capable of automatically heating the ingredients according to a cooking method; a configuration of processing food ingredients by disposing a condiment unit that can place various seasoning or spice, edible oil and other oils suitable for the cooking; a configuration of processing food ingredients by installing an automatic water supply device which automatically supplies water according to a cooking method; a configuration of processing food ingredients by disposing an utensil unit which places utensils capable of putting the food ingredient according to the finished cuisine; a configuration which is processed by disposing a meal delivery unit which plays a role of the exit to pass with utensils containing the finished cooking product to the outside; a configuration which is processed by installing a washing unit capable of washing a container or a cooking device after cooking; a configuration which is processed by disposing a drain unit which can drain water after washing; and a configuration which is processed by installing a ventilation unit that can circulate air inside the cooking chamber.

In addition, the cooking chamber comprises: a configuration which is processed by installing an automatic moving arm that can move the container or utensil according to the cooking method to the heating unit, the container unit, the meal delivery unit and the other washing unit; a configuration which is processed by installing an automatic moving unit that can move the cooking device for agitating or mixing according to the cooking method into the heating unit or the cooking device unit; a configuration which is processed by installing a dynamic automatic instrument fixed part that grasp the cooking device so that it can be automatically agitated or used with shaking by automatically fixing the cooking device to the heating unit; a configuration which is processed by installing a pipe which automatically adjusts and automatically opens and closes so that the respective seasoning or spice, edible oil and other oils according the cooking method can be used in the condiment unit; a configuration which is processed by installing an apparatus for maintaining the cooking chamber at a low temperature when the kitchen is not operated in order to prevent pests from entering the inside of the cooking chamber; a configuration which is processed by stopping an apparatus for maintaining the cooking chamber at a low temperature when the cooking chamber is operated; and a configuration which can extinguish fire by using water or by blocking oxygen by installing a fire alarm system upon firing and a water supply equipment on the ceiling of the cooking chamber in order to prevent fire in the cooking chamber.

The above-described conveyor unit comprises a configuration which is processed by fixing the material delivering, to the conveyor unit, utensils for one to several persons which can receive and supply food ingredients according to the amount of the food ingredients used for the cooking in the material box of the cold storage; a configuration which is processed such that the conveyor unit can be automatically rotated by a chain or the like; a configuration which is processed so as to receive food ingredients by automatically disposing the material delivery equipment based on each person on the heating unit of the cooking chamber; a configuration which is processed by turning the material delivery utensils on the container placed on the heating unit of the cooking chamber and putting the food ingredients in the container; a configuration which is processed by disposing, within the cooking chamber, a utensil washing unit which washes the material delivery utensils after delivery of the food ingredients; and a configuration which is processed by installing a drain unit which drains the washed wastewater.

Embodiments for Carrying Out the Invention

Hereinafter, the automatic cooking device standardization system according to the present invention will be described in detail.

The automatic cooking device standardization system according to the present invention can automatically cook dishes without requiring user's manual work, and is characterized in that the automatic cooking device is standardized by installing a cold storage for storing food ingredients used for each cooking, installing a cooking chamber capable of cooking dishes according to the cooking method, order and time during the cooking, and installing a conveyor unit for conveying food ingredients for each dish from the cold storage to cooking containers in the cooking chamber according to a cooking order and time.

The above-described cold storage comprises a configuration of processing food ingredients by dividing material compartments capable of storing the respective ingredients in the cold storage; a configuration of processing food ingredients by making material box capable of taking out or putting in each material storage compartment; a configuration of processing food ingredients by plurally dividing them within the respective material box in an amount for one person and putting the ingredients on the box; a configuration of installing an internal rotation unit in the material box so that the food ingredients can be taken out for one person or plural persons; a configuration of installing an external rotation unit capable of rotating in engagement with the outside of the material box; a configuration capable of maintaining the freshness of the food ingredients by rapidly freezing the material box when the standardized automatic cooking device is not used for a long period of time; and a configuration of processing the food ingredients by installing a rapid cooling device and a thawing device capable of thawing upon re-use.

The above-described cooking chamber comprises: a configuration of processing food ingredients by disposing a container unit that can put a container such as a fried fan for cooking dishes; a configuration of processing food ingredients by disposing a cookware unit which can place a cooking device or the like for agitating or mixing the ingredients during the cooking; a configuration of processing food ingredients by installing a heating unit capable of automatically heating the ingredients according to a cooking method; a configuration of processing food ingredients by disposing a condiment unit that can place various seasoning or spice, edible oil and other oils suitable for the cooking; a configuration of processing food ingredients by installing an automatic water supply device which automatically supplies water according to a cooking method; a configuration of processing food ingredients by disposing an utensil unit which places utensils capable of putting the food ingredients according to the finished cuisine; a configuration which is processed by disposing a meal delivery unit which plays a role of the exit to pass with utensils containing the finished cooking product to the outside; a configuration which is processed by installing a washing unit capable of washing a container or a cooking device after cooking; a configuration which is processed by disposing a drain unit which can drain water after washing; and a configuration which is processed by installing a ventilation unit that can circulate air inside the cooking chamber.

In addition, the cooking chamber comprises: a configuration which is processed by installing an automatic moving arm that can move the container or utensil according to the cooking method to the heating unit, the container unit, the meal delivery unit and the other washing unit; a configuration which is processed by installing an automatic moving unit that can move the cooking device for agitating or mixing according to the cooking method into the heating unit or the cooking device unit; a configuration which is processed by installing a dynamic automatic instrument fixed part that grasp the cooking device so that it can be automatically agitated or used with shaking by automatically fixing the cooking device to the heating unit; a configuration which is processed by installing a pipe which automatically adjusts and automatically opens and closes so that the respective seasoning or spice, edible oil and other oils according the cooking method can be used in the condiment unit; a configuration which is processed by installing an apparatus for maintaining the cooking chamber at a low temperature when the cooking chamber is not operated in order to prevent pests from entering the inside of the cooking chamber a configuration which is processed by stopping an apparatus for maintaining the cooking chamber at a low temperature when the cooking chamber is operated; and a configuration which can extinguish fire by using water or by blocking oxygen by installing a fire alarm system upon firing and a water supply equipment on the ceiling of the cooking chamber in order to prevent fire in the cooking chamber.

The above-described conveyor unit comprises a configuration which is processed by fixing the material delivering, to the conveyor unit, utensils for one to several persons which can receive and supply food ingredients according to the amount of the food ingredients used for the cooking in the material box of the cold storage; a configuration which is processed such that the conveyor unit can be automatically rotated by a chain or the like; a configuration which is processed so as to receive food ingredients by automatically disposing the material delivery equipment based on each person on the heating unit of the cooking chamber; a configuration which is processed by turning the material delivery utensils on the container placed on the heating unit in the cooking chamber and putting the food ingredients in the container; a configuration which is processed by disposing, within the cooking chamber, a utensil washing unit which washes the material delivery utensils after delivery of the food ingredients; and a configuration which is processed by installing a drain unit which drains the washed wastewater.

One embodiment of the present invention provides an automatic cooking device standardization system characterized in that, when standardizing the automatic cooking device, the automatic cooking device having the above-described configuration can be processed so as to automatically cook one or two dishes.

One embodiment of the present invention provides an automatic cooking device standardization system which comprises a configuration capable of setting the kind of the cooking by installing, to the outside, a setting monitor capable of setting the execution of the automatic cooking device; a configuration which is processed by setting the amount of food ingredients used for the cooking and the reservation of the execution time thereof; a configuration which is processed such that the food ingredients within the automatic cooking device can be freely selected; a configuration capable of freely setting the cooking order or the cooking method so as to make dishes to suit the user's preference; and a configuration which is processed by remotely setting from the mobile terminal or PC by a method of connecting and processing to an internet communication line.

One embodiment of the present invention provides an automatic cooking device standardization system which is standardized in a manner that can cook one or two dishes depending on the cooking type, and the product standardized by such an automatic cooking device is delivered to a shop or a restaurant.

One embodiment of the present invention provides an automatic cooking device standardization system in which food ingredients stored in a cold storage of each automatic cooking device is standardized by processing them to fit the size of the material box entering each material compartment of the cold storage, and the standardized product is continuously delivered to a consumer which has bought a product or the consumer can also purchase.

INDUSTRIAL APPLICABILITY

The automatic cooking device standardization system according to the present invention can provide a standardized product by comprising a cold storage, a cooking chamber and a conveyor unit, and can be used in the field of preparing household appliances for the standardized automatic cooking device capable of cooking dishes without user's manual work if only the food ingredients are put in the cold storage.

What is claimed is:

1. An automatic cooking device standardization system comprising:
   a cold storage for storing food ingredients used for cooking,
   a cooking chamber capable of cooking dishes according to cooking recipes, the cooking chamber including cooking containers, and
   a conveyor unit for conveying selected food ingredients for each dish from the cold storage to the cooking containers in the cooking chamber, the selected food ingredients being selected from the food ingredients according to the cooking recipes,
   wherein the cold storage comprises material boxes, each material box for storing an amount of the food ingredients for one person or plural persons, an internal rotation unit for taking out the amount of the food ingredients in the each material box, and an external rotation unit for delivering the amount of the food ingredients taken out from the internal rotation unit to the conveyor unit,
wherein the cooking chamber comprises:
a container unit configured to store the cooking containers,
a moving arm configured to move the cooking containers and utensils,
a heating unit configured to heat the cooking containers according to the cooking recipes, the cooking containers being moved from the container unit to the heating unit by the moving arm,
a cookware unit configured to store a cooking device for mixing or agitating the food ingredients of the cooking containers during cooking, the cooking device being fixed by an automatic instrument fixing part,
a condiment unit configured to store various seasonings and supply the seasonings to the cooking containers via a first pipe, the first pipe including a first valve that opens and closes such that the seasonings are supplied to the cooking containers according to the cooking recipes,
a water supply unit configured to supply water to the cooking containers, via a second pipe, the second pipe including a second valve that opens and closes such that the water is supplied to the cooking containers according to the cooking recipes,
a utensil unit configured to store the utensils for containing the dishes, the moving arm putting the dishes of the cooking containers completed according to the cooking recipes on the utensil and
a meal delivery unit configured to deliver the utensils containing the dishes to outside of the cooking chamber.

2. The automatic cooking device standardization system according to claim 1, wherein the automatic cooking device standardization system is configured so as to cook at least one dish depending on a cuisine type.

3. The automatic cooking device standardization system according to claim 1, further comprising a setting monitor for setting the cooking recipes, and reserving an execution time, as a user desires, the setting monitor being provided outside of the automatic cooking device standardization system.

4. The automatic cooking device standardization system according to claim 3, wherein the automatic cooking device standardization system is configured to a cooking method to suit the user's preference.

5. The automatic cooking device standardization system according to claim 3, wherein the automatic cooking device standardization system is configured to be controlled by a mobile terminal or PC through an internet communication line.

* * * * *